United States Patent [19]

Iijima et al.

[11] Patent Number: 5,172,799
[45] Date of Patent: Dec. 22, 1992

[54] CENTRIFUGAL HYDRAULIC CANCEL MECHANISM FOR THE ROTATING CLUTCH

[75] Inventors: Yoshihiro Iijima, Toyota; Tokuyuki Takahashi, Owariasahi; Kojiro Kuramochi, Okazaki; Mikio Mori, Toyota; Norihiro Kitamura, Toyota; Yuji Yasuda, Toyota, all of Japan

[73] Assignee: Toyota Jidosha Kabushiki Kaisha, Toyota, Japan

[21] Appl. No.: 831,842

[22] Filed: Feb. 6, 1992

[30] Foreign Application Priority Data

Feb. 8, 1991 [JP] Japan .................................. 3-37693
Dec. 26, 1991 [JP] Japan ................................. 3-360391

[51] Int. Cl.⁵ .............................................. F16D 25/61
[52] U.S. Cl. ............................ 192/106 F; 192/85 AA; 192/85 R
[58] Field of Search ........... 192/106 F, 85 A, 85 AA, 192/85 R, 91 R, 91 A

[56] References Cited

U.S. PATENT DOCUMENTS

| | | | |
|---|---|---|---|
| 2,837,192 | 6/1958 | Dunkelon | 192/85 AA |
| 2,869,701 | 1/1959 | Yokel | 192/85 AA |
| 2,965,207 | 12/1960 | Snyder | 192/85 AA |
| 3,202,253 | 8/1965 | Merritt et al. | 192/85 AA X |
| 3,273,415 | 9/1966 | Frost | 192/85 AA |
| 3,677,381 | 7/1972 | Takagi et al. | 192/106 F |
| 3,823,802 | 7/1974 | Winzeler et al. | 192/106 F X |
| 3,863,746 | 2/1975 | Schulz | 192/106 F |
| 4,566,572 | 1/1986 | Foltow et al. | 192/85 AA X |
| 4,732,253 | 3/1988 | Hiramatsu et al. | 192/106 F X |
| 4,741,422 | 5/1988 | Fuehrer et al. | 196/106 F X |
| 4,957,195 | 9/1990 | Kano et al. | 192/106 F |

FOREIGN PATENT DOCUMENTS

| | | | |
|---|---|---|---|
| 0157520 | 8/1985 | Japan | 192/106 F |
| 62-52249 | 3/1987 | Japan . | |
| 2-27024 | 2/1990 | Japan . | |
| 895061 | 4/1962 | United Kingdom | 192/106 F |

Primary Examiner—Leslie A. Braun
Assistant Examiner—Andrea Pitts
Attorney, Agent, or Firm—Oblon, Spivak, McClelland, Maier & Neustadt

[57] ABSTRACT

A centrifugal hydraulic cancel mechanism for the rotating clutch in which a first cylindrical body and a second cylindrical body whose diameter is smaller than the first cylindrical body are set on a same central axis, frictional plates are attached to an inner surface of the first cylindrical body and an outer surface of the second cylindrical body, which transmit torque with their friction, a piston is arranged to move forward and backward to the frictional plates, a fluid chamber is formed on the opposite side of the piston in respect to the frictional plates, and a cancel chamber is formed at an opposite side to the fluid chamber in respect to the piston, where oil pressure can be supplied and discharged, comprises an auxiliary oil chamber formed closer to the central axis than the cancel chamber, and a fluid passageway connecting the cancel chamber and the auxiliary oil chamber.

18 Claims, 2 Drawing Sheets

CENTRIFUGAL HYDRAULIC CANCEL MECHANISM FOR THE ROTATING CLUTCH

BACKGROUND OF THE INVENTION

This invention relates to automatic transmissions, in which the speed is changed by means of transferring the torque from the transmission shaft similar to the actions of a clutch. The present invention especially concerns the engaging and releasing of the clutch by means of fluid pressure. This is done by means of canceling the original centrifugal hydraulic force in connection with the cancel mechanism.

When there is the appropriate engaging and releasing of the clutch and brake for automatic transmissions, there is a change in the motion of the transmission course in the gear train. This then establishes the plurality of gear stages. For the clutch and brake system in general, the piston is driven by the fluid pressure and engagement is performed by means of the hydraulic servomechanism. For this engaging process, the torque transmission of the clutch and brake system not only meets with resistance, but during the engaging and releasing action, because of the sliding action, it sucks in the used energy and the operation then proceeds with a reduction in shift shock. Therefore reducing the shift shock is an important essential element and is done by means of accurately controling the timing for engaging and releasing the clutch and brake by the hydraulic servomechanism.

The timing for engaging and releasing the clutch and brake system by the hydraulic servomechanism is mostly determined by the degree in the rise and fall of the supply and release of fluid pressure to the hydraulic servomechanism. However, there are times when the hydraulic servomechanism is rotating which makes the expected control of this fluid pressure difficult to achieve.

For engaging the clutch, the hydraulic servomechanism also rotates in the same way. This is because there is a joint that transmits the torque from a part of the rotating input shaft to another rotating part. As the hydraulic servomechanism receives oil, the rotation speed and rotating radius operate by the produced centrifugal force. However, even with the output pressure from the hydraulic servomechanism which should release the clutch, the piston still operates based on the hydraulic pressure from the centrifugal force and the clutch release then becomes slow.

In order to eliminate this unfavourable condition, a check ball valve has been provided inside the piston chamber which receives oil for driving the piston. When it is time to discharge pressure, the check ball valve is opened and the pressure is discharged from the piston chamber.

However, there are times when even the check ball valve does not open so easily due to the centrifugal force. Up until now, many cancel chambers (balance chambers) have been provided to better avoid the effect of the centrifugal hydraulic pressure. One such invention is disclosed in the Japanese Patent laid-open No. 62-52249.

The cancel chamber is employed for eliminating the influence that the centrifugal force has on the piston motion and the engaging and releasing of the clutch. This is done by means of balancing the operational hydraulic chamber which supplies a high pressure fluid for the piston to move the clutch. The high pressure centrifugal fluid pressure chamber is mostly supplied by the balancing of the original operating fluid chamber for the centrifugal force. This produces the pressure and is formed between the piston along with the pressure produced from the centrifugal force in the centrifugal fluid pressure chamber.

Referring to the said cancel chamber, the forward and reverse action of the piston operates along with the increase and decrease of the centrifugal hydraulic chamber. Up until now, an opening was made in the centrifugal fluid chamber coming from the divided fluid passage and traveling along the main fluid passage of the input shaft. The fluid (oil) of the centrifugal hydraulic chamber is discharged or supplied from the fluid passage.

However, in the main fluid passage, even though there are many places where shaft bushes supply fluid, a means to accommodate an equal balance for the changing fluid volume has not been provided for the action of the hydraulic servomechanism. In the cancel mechanism of the prior art, when the volume of the centrifugal fluid pressure chamber greatly increases and the piston returns to the operating hydraulic chamber, the volume of fluid supplied to the centrifugal fluid pressure chamber is not sufficient. The result is that the centrifugal fluid pressure chamber produces an air space and the effective radius quality becomes smaller for the centrifugal fluid pressure chamber.

In the cancel mechanism of the prior art, there has been the problem of an air space being produced inside the centrifugal hydraulic chamber. Then the centrifugal fluid pressure becomes even lower for the operational hydraulic chamber for the so-called produced centrifugal hydraulic pressure. Then the clutch timing for engaging and releasing becomes inappropriate because the effect of the centrifugal force on the piston operation has not completely been eliminated and the shift shock can become very large.

SUMMARY OF THE INVENTION

It is an object of this invention to provide a centrifugal hydraulic cancel mechanism for preventing the deterioration of the shift shock, controlling the engaging and releasing of the clutch, and lessening the influence of the centrifugal force.

Another important object of the invention is to provide a hydraulic cancel mechanism to lower the oil pressure for engaging the clutch.

An additional object of this invention is to provide a centrifugal hydraulic cancel mechanism to prevent the frictional increase in multi-disc clutches.

Another additional object of this invention is to employ a smaller automatic transmission including a rotating clutch.

In this invention, the front part of a piston puts compression on frictional plates, a cancel chamber is formed to fill up with oil and the pressure is raised due to a centrifugal force. A connecting auxiliary oil chamber is formed on the inner side rather than on the cancel chamber. When the cancel chamber and auxiliary oil chamber are rotating together with the clutch, the fluid fills up the cancel chamber and the auxiliary oil chamber and its pressure is raised by means of a centrifugal force. The cancel chamber is supplied with sufficient oil depending on how large the volume capacity is for the auxiliary chamber. Moreover, since the centrifugal oil pressure that is produced also depends on the oil that is inside the auxiliary oil chamber, this has a large effect on the quality of the radius on the inside of the cancel chamber. For this invention, it is not necessary to enlarge the radius of the cancel chamber, which means a smaller shape can be employed for automatic transmissions. Also since the effective radius for the oil chamber that moves the piston forward does not become smaller in size, a lower oil pressure for engaging the clutch can be employed. Any increase in the number of the frictional plates is also prevented.

The auxiliary oil chamber for this invention is surrounded and formed by means of one adjacent member for one member of an inner clutch drum and one part of an inner clutch hub. Since the number of parts does not particularly increase, the shortening of the automatic transmission shaft length can be employed.

The above and further objects and novel features of the invention will more fully appear from the following detailed description when the same is read in connection with the accompanying drawings. It is to be expressly understood, however, that the drawings are for the purpose of illustration only and is not intended as a definition of the limits of the invention.

DETAILED DESCRIPTION OF THE PREFERRED EMBODIMENT

Figure 1:
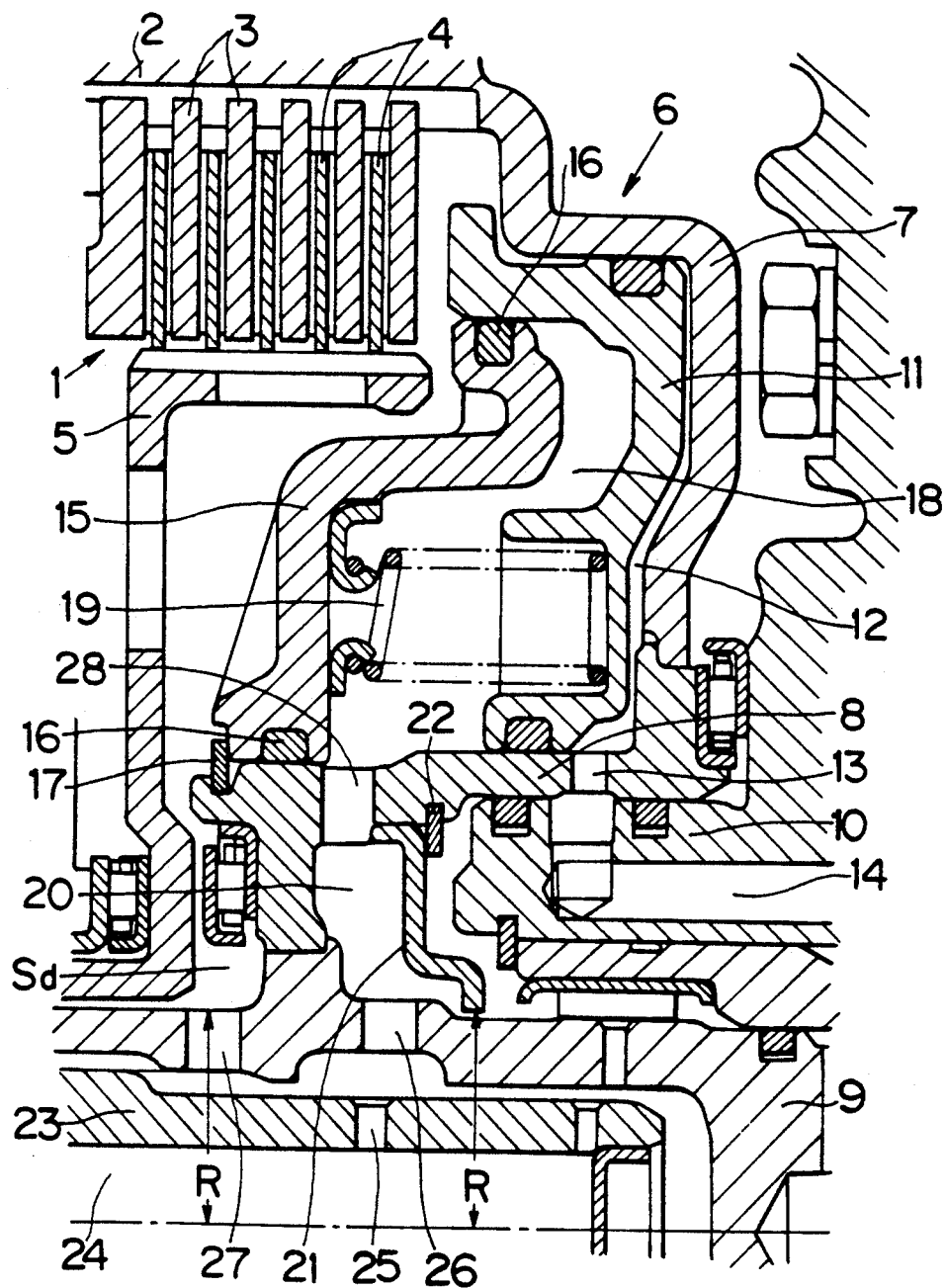
FIG. 1, is a partial cross sectional view illustrating an embodiment of the present invention.

FIG. 1 is a sectional view of this invention illustrating an embodiment from the upper half of a center line. FIG. 1 shows a rotating clutch 1, where multiple disc clutch plates 3 are splined to an inside face of a first clutch drum 2. Clutch discs 4 fit between clutch plates 3. A clutch hub 5 as a second cylindrical member has a smaller diameter than clutch drum 2 and the clutch discs 4 are splined to the outside face of clutch hub 5. The combined action of clutch plates 3 and clutch discs 4 creates a frictional pressure which transmits the torque.

A hydraulic servomechanism 6 which engages and releases the rotating clutch 1 rotates with the clutch drum 2 as a single unit. The clutch drum 2 is formed as a single unit with a piston housing 7. This piston housing 7 has an inside boss 8 which has a smaller diameter than the clutch drum 2. The end of boss 8 is connected with an input shaft 9. Maintaining the univesal rotation of the piston housing 7 is done by universally setting the boss 8 to rotate on the outside portion of a fastened boss 10. The boss that sticks out of the oil pump cover, not shown here, is used as the fastened boss 10.

Inside the piston housing 7, a sealed piston 11 is located between the outer face of the boss 8 and the inner face of the piston housing 7 and is in a liquid-tight condition. This is all to provide a means for forward and reverse movement for the said clutch plates 3 and the clutch discs 4. Behind piston 11, i.e., on the opposite side of clutch plates 3 and clutch discs 4 (to the right of FIG. 1), the piston housing 7 and piston 11 forms and surrounds a fluid pressure chamber 12. The fluid pressure chamber 12 is the means for engaging the clutch 1 to move the piston 11 forward, by means of supplying the designated oil pressure. A fluid opening way 13 is formed on the boss 8 and a fluid passage 14 is formed on the fastened boss 10 to provide an oil pressure discharge for the fluid pressure chamber 12.

A balance piston 15 is placed on the opposite side of the fluid pressure chamber 12, i.e., in front of the piston 11. The balance piston 15 has a ring-shaped section as shown in FIG. 1, and is inserted into the inner side of the piston 11. The boss 8 is inserted into the inner side of the balance piston 15. Seals 16 are set between the balance piston 15 and the piston 11, and between piston 15 and the boss 8 for maintaining a liquid-tight condition, respectively. The balance piston 15 is fastened by a snap ring 17 that is set to the boss 8. A cancel chamber 18 is formed in the space between the balance piston 15 and the piston 11 where oil is filled up. A return spring 19 is shown in FIG. 1. The return spring 19 is attached to the inner face of the balance piston 15 and puts pressure on piston 11 in the direction of the fluid pressure chamber 12.

A vacant space is formed at the inside of the boss 8 and in front of the fastened boss 10, and a dividing member 21 is placed in the vacant space. A compartment is formed by the dividing member 21 as an auxiliary oil chamber 20. The dividing member 21 has a ring-shaped section as shown in FIG. 1. It is inserted into the boss 8 and non-rotatably fastened by a snap ring 22. The inner face of the dividing member 21 is adjacent to the input shaft 9 and fits into a small space in the outer face of the input shaft 9. A compartment for the auxiliary oil chamber 20 is formed inside the before mentioned cancel chamber 18 and has a small opening for fluid.

The top portion of an input shaft 9 is hollow where an intermediate shaft 23 is inserted. The end points of a main fluid passage 24 are sealed tight with a plug forming a center axis that runs along the intermediate shaft 23. A fluid divergence 25 is formed from the main fluid passage 24 when the main fluid passage 24 reaches the outer face of the intermediate shaft 23.

The input shaft 9 has a first fluid passage 26 coming from an inner surface to the outer surface facing the auxiliary oil chamber 20 and a second fluid passage 27 is formed to the opening of a drain chamber Sd and to the inside of the said clutch hub 5. The radius R from the rotational center to the opening edge of the second fluid passage 27 at the drain chamber Sd is equal to the radius R from the rotational center to the inner edge of the dividing member 21. If the rotating radius of the inner edge of the dividing member 21 which forms an inside opening of the auxiliary oil chamber 20, is set equal to the rotating radius of the opening edge of the second oil passage 27 towards the drain chamber Sd, the centrifugal pressure at the first oil passage 26 and the second oil passage 27 are equal to each other. This is because the centrifugal oil pressure increases in proportion to the rotating radius. The oil discharge coming from the inner face of the auxiliary oil chamber 20 then has a smooth flow. A small passage way 28 connecting the auxiliary oil chamber 20 and the cancel chamber 18 is formed on the boss 8 of the piston housing 7.

As set forth hereinabove, the use of the centrifugal oil pressure cancel mechanism is described. The rotating clutch 1 is in the released position as shown in FIG. 1. Then by means of the discharging force coming from the fluid pressure chamber 12, piston 11 is pushed back by the return spring 19.

In the illustration, the oil is supplied through the inside fluid passage 14 of the fixed boss 10 and the fluid opening way 13 of the boss 8. This happens when a shift valve not shown is changed so that piston 11 slowly pushes the return spring 19 forward with compression from the fluid pressure. The capacity of the cancel chamber 18 is then reduced and the fluid in it is discharged through the connecting small fluid passage 28 and the auxiliary oil chamber 20 by way of the first oil passage 26 to the inside of the input shaft 9. The centrifugal oil pressure is employed at a low level when oil is discharged by these means. The radius of the outer opening point of the second fluid passage way 27 and the radius of the inner face of the said dividing member 21 are equal. Then the centrifugal oil pressure at the opening of the first fluid passage way 26 in the auxiliary oil chamber 20, and the centrifugal oil pressure at the opening of the second fluid passage way 27 in the vacant drain chamber, are both equalized. This causes the oil discharge to flow freely and discharge smoothly both for the oil outflow and the vacant drain chamber.

However when referring to fluid chamber 12, the inner fluid is rotated around to produce a centrifugal oil pressure. The same centrifugal oil pressure is also produced for the cancel chamber 18 between the piston 11 in the fluid pressure chamber 12. Oil then fills the auxiliary oil chamber 20, which is located on the inner face from cancel chamber 18. The oil is also added to the inner oil pressure of the cancel chamber 18. The fluid pressure chamber 12 and the cancel chamber 18 take away oil pressure and cause the centrifugal oil pressure to decrease respectively.

The oil pressure of cancel chamber 18 has no or only a slight effect on the forward motion on the piston 11. The forward motion of the piston 11 is provided by the oil pressure supplied from the oil pressure chamber 12 and direct pressure from the clutch plates 3 and the clutch discs 4. The expected control for timing the engagement of the rotating clutch or the amount of torque depends on the oil pressure supplied to the fluid pressure chamber 12.

Even when the rotating clutch is in the engaged position, fluid fills up the cancel chamber 18 and the auxiliary oil chamber 20. From this position the discharging pressure from the fluid chamber 12 should release the rotating clutch 1. The piston 11 is returned back by the compressing action of the return spring 19. The hydraulic servomechanism 6 is rotating because an auxiliary oil pressure exists inside the fluid chamber 12. The counter auxiliary oil pressure enters in the cancel chamber 18, so the fluid pressure in chamber 12 drops to a certain degree and the piston 11 returns.

Since the volume capacity greatly increases in the cancel chamber 18 along with returning action of the piston 11, oil is supplied through the small passage way 28 on the inside of the cancel chamber 18. The oil is also supplied from the auxiliary chamber 20, which is formed adjacent to the cancel chamber 18. The volume of oil that is needed for increasing the capacity of cancel chamber 18 is quickly supplied because a certain volume of oil was previously supplied in full to the auxiliary oil chamber 20.

In the said cancel mechanism, a vacant space is produced when there is a lack of fluid in the cancel chamber 18, or when the centrifugal pressure drops to a low level. Then the expected control for timing the release of clutch 1 or the torque capacity is then done by means of the fluid chamber 12.

Figure 2:
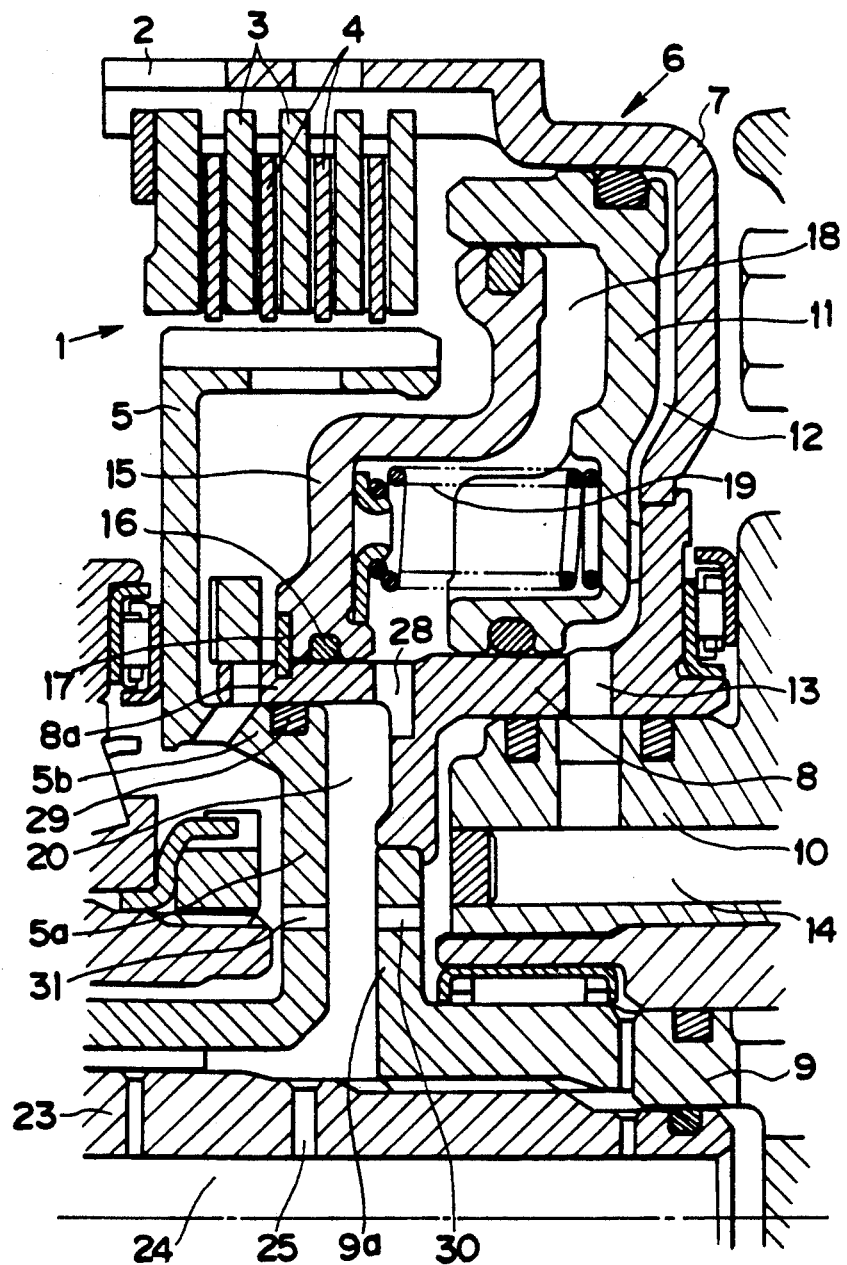
FIG. 2, is a partial cross sectional view illustrating another embodiment of the present invention.

In the said embodiment, the auxiliary oil chamber 20 has formed a compartment because of the dividing member 21 is set to the inside of the boss 8. The structure of the above mentioned auxiliary oil chamber 20 as shown in the embodiment, is not limited only to this structure. The embodiment of an auxiliary chamber without the use of a dividing member 21 is shown in FIG. 2. The following refers to the same construction or the same parts as shown in FIG. 2. The numbering in FIG. 2 is the same as that of FIG. 1, so the description has been shortened.

Referring to FIG. 2 for the end points of the input shaft 9, the flange 9a is formed adjacent to the end point of the said fastened boss 10. The intermediate of the boss 8 for the clutch drum 2 is fastened to the outer ends of the flange 9a. The fastened parts for flange 9a are also formed to the end points of the extended cylinder 8a (left side of FIG. 2), for the boss 8. However, for the inner face of the said clutch hub 5, there is a cylinder part 5b formed on the inner face of the cylindrical portion 8a and is set to a wall member area 5a. The hydraulic fluid has been sealed by a means of a seal ring 29. Seal ring 29 is placed in the vacant compartment between the outer face of the cylindrical part 5b and the cylindrical portion of the boss 8. On the wall member area 5a for clutch hub 5 and for the flange 9a of input shaft 9, the radius position for the rotating central axis and the same fluid passages 30 and 31 have been formed. The outside area from the said fluid passages 30 and 31 becomes the auxiliary oil chamber 20 inside a vacant chamber in the formed compartment. This vacant chamber is made by means of the flange 9a of the input shaft 9 and the cylinder portion of the drum 2, as well as the cylinder portion of the clutch hub 5. This auxiliary oil chamber 20 and the cancel chamber 18 have a passage throughway by means of a passage throughway opening.

Even referring to the construction shown in FIG. 2, the centrifugal force is received by the auxiliary oil chamber 20 and the cancel chamber 18. Then because of the returning centrifugal oil pressure for the piston 11, which is to the right of FIG. 2, the outer diameter of balance piston 15 becomes larger so that a sufficient amount of needed compression from the centrifugal oil pressure is produced. For controling piston 11, the expected actual return of the released rotating clutch 1 can be employed when the rotating clutch 1 is released. Since the dividing member 21 is not set up as shown in the construction in FIG. 2, the space for the course of the shaft axis can be shortened. Then the reduction of the length of the automatic transmission shaft can be employed. Also, since the dividing member 21 is not set up as shown in the construction in FIG. 2, the space for the course of the shaft axis can be shortened. Then a reduction in the length of the automatic transmission can be employed.

The said dividing member 21 is generally formed on the boss 8 with a number of selected materials. It can also be formed on the auxiliary oil chamber or it can be set to the inner area of the cancel chamber 18 with the appropriate hollow for material. Using the auxiliary oil chamber as a hollow member is also good.

When using the centrifugal oil pressure cancel mechanism for the described invention, the connecting auxiliary chamber passageway for the cancel chamber is formed on the inner area of the cancel chamber. Since this auxiliary oil chamber has been constructed to sufficiently receive the needed fluid, the actual available radius diameter for the inner cancel chamber is enlarged. Then because of the centrifugal oil pressure that is produced in the cancel chamber, the centrifugal oil pressure produced in the fluid pressure chamber is actually reduced or completely offset. Then the rotating clutch control is not effected by the centrifugal oil pressure and can proceed with precision accuracy. Deterioration of the shock is also prevented.

What is claimed is:

1. A centrifugal hydraulic cancel mechanism for a rotating clutch in which a first cylindrical body and a second cylindrical body whose diameter is smaller than the first cylindrical body are set on a single central axis, frictional plates are attached to an inner surface of the first cylindrical body and an outer surface of the second cylindrical body so as to frictionally transmit torque, a piston is arranged to move forward and backward relative to the frictional plates, a fluid chamber is formed on an opposite side of the piston with respect to the frictional plates, and a cancel chamber is formed at an opposite side to the fluid chamber with respect to the piston, where oil pressure can be supplied and discharged, comprising:

means forming an auxiliary oil chamber formed closer to the central axis than the cancel chamber, and means forming a fluid passageway connecting the cancel chamber and the auxiliary oil chamber wherein said means forming an auxiliary oil chamber is non-rotatingly attached to said means forming a fluid passageway.

2. The centrifugal hydraulic cancel mechanism for a rotating clutch according to claim 1, wherein the said auxiliary oil chamber has a greater volume capacity than a volume capacity of the fluid passageway.

3. The centrifugal hydraulic cancel mechanism for a rotating clutch according to claim 1, wherein the said auxiliary oil chamber has an opening which opens towards the central axis.

4. The centrifugal hydraulic cancel mechanism for a rotating clutch according to claim 1, wherein the first cylindrical body comprises a clutch drum which has the frictional plates on its inner surface, a piston housing which is formed as one unit with the clutch drum and accommodates the piston in a liquid-tight condition, and a cylindrical boss which is formed on an inner portion of the piston housing as one unit and has a smaller diameter than the second cylindrical body.

wherein the piston has a cylindrical protruding portion on its outer portion sticking out towards the frictional plates, wherein a balance piston is inserted between the outer surface of the boss and the inner surface of the protruding portion in a liquid-tight condition and is fixed to the boss, which forms the cancel chamber between the piston, and wherein an auxiliary oil chamber is formed at the inner side of the boss and the fluid passageway is formed through the boss.

5. The centrifugal hydraulic cancel mechanism for the rotating clutch according to claim 4, further comprising a return spring located between the piston and the balance piston to push the piston back.

6. The centrifugal hydraulic cancel mechanism for the rotating clutch according to claim 4, further comprising:

an input shaft is located on the same central axis for rotation as the first cylindrical body, a flange formed at a top end of the input shaft and fixed to an intermediate inner surface of the boss in an axial direction thereof, and a cylindrical portion with a side wall along in a radial direction thereof which is formed as one unit with the second cylindrical body and inserted into the top end portion of the boss in a liquid tight condition, wherein the auxiliary oil chamber is formed between the flange and the cylindrical portion.

7. The centrifugal hydraulic cancel mechanism for a rotating clutch according to claim 6, wherein the said fluid passage is formed through the radius direction of the boss.

8. The centrifugal hydraulic cancel mechanism for the rotating clutch according to claim 7, further comprising a return spring located between the piston and the balance piston.

9. The centrifugal hydraulic cancel mechanism for the rotating clutch according to claim 8, comprising:

a hollow intermediate shaft located on the same central axis as the input shaft, which is inserted into the top end of the input shaft and has a main oil passage along its central axis, a connecting oil opening formed through the intermediate shaft and connecting the main oil passage and the auxiliary oil chamber.

10. The centrifugal hydraulic cancel mechanism for the rotating clutch according to claim 8, comprising:

another oil passage formed through the flange, and a further oil passage formed on a portion of the wall, of which a rotating radius is the same as a rotating radius of the other oil passage.

11. The centrifugal hydraulic cancel mechanism for the rotating clutch according to claim 8, comprising:

a hollow intermediate shaft located on the same central axis as the input shaft, which is inserted into the top end of the input shaft and has a main oil passage along its central axis, a further connecting oil opening formed through the intermediate shaft and connecting the main oil passage and the auxiliary oil chamber.

12. A centrifugal hydraulic cancel mechanism for a rotating clutch in which a first cylindrical body and a second cylindrical body whose diameter is smaller than the first cylindrical body are set on a single central axis, frictional plates are attached to an inner surface of the first cylindrical body and an outer surface of the second cylindrical body so as to frictionally transmit torque, a piston is arranged to move forward and backward relative to the frictional plates, a fluid chamber is formed on an opposite side of the piston with respect to the frictional plates, and a cancel chamber is formed at an opposite side to the fluid chamber with respect to the piston, where oil pressure can be supplied and discharged, comprising:

an auxiliary oil chamber formed closer to the central axis than the cancel chamber, and a fluid passageway connecting the cancel chamber and the auxiliary oil chamber, wherein the first cylindrical body comprises a clutch drum which has the frictional plates on its inner surface, a piston housing which is formed as one unit with the clutch drum and accommodates the piston in a liquid-tight condition, and a cylindrical boss which is formed on an inner portion of the piston housing as one unit and has a smaller diameter than the second cylindrical body, wherein the piston has a cylindrical protruding portion on its outer portion sticking out towards the frictional plates, wherein a balance piston is inserted between the outer surface of the boss and the inner surface of the protruding portion in a liquid-tight condition and is fixed to the boss, which forms the cancel chamber between the piston, and wherein an auxiliary oil chamber is formed at the inner side of the boss and the fluid passageway is formed through the boss, further comprising a circular dividing member that is attached to the inner surface of the boss to form the auxiliary oil chamber.

13. The centrifugal hydraulic cancel mechanism for the rotating clutch according to claim 12, further comprising:

a hollow input shaft which is located on the inner side of the dividing member and forms a main oil passage in it, a vacant space formed on the outer side of the hollow input shaft, of which inner pressure is maintained at nearly atmospheric pressure, a first fluid passage formed through the hollow input shaft in a radial direction thereof and connecting the main oil passage and the auxiliary oil chamber, and a second fluid passage formed through the hollow input shaft in a radial direction thereof and connecting the main oil passage and the vacant space, wherein the inner diameter of the dividing member is equal to the outer diameter of a portion of the hollow input shaft where the second oil passage opens.

14. A centrifugal hydraulic cancel mechanism for a rotating clutch in which a first cylindrical body and a second cylindrical body whose diameter is smaller than the first cylindrical body are set on a single central axis, frictional plates are attached to an inner surface of the first cylindrical body and an outer surface of the second cylindrical body so as to frictionally transmit torque, a piston is arranged to move forward and backward relative to the frictional plates, a fluid chamber is formed on an opposite side of the piston with respect to the frictional plates, and a cancel chamber is formed at an opposite side to the fluid chamber with respect to the piston, where oil pressure can be supplied and discharged, comprising:

an annular auxiliary oil chamber formed by rotating members at a closer portion to the central axis than the cancel chamber, said rotating member rotate together with the rotating clutch, and a fluid passageway connecting the cancel chamber and the auxiliary oil chamber.

15. A centrifugal hydraulic cancel mechanism for a rotating clutch of claim 14, wherein the rotating members include a cylindrical boss formed on an inner portion of the first cylindrical body as one unit, an outer portion of a hollow shaft connected to the boss and a circular dividing member fixed to the inner surface of the boss.

16. The centrifugal hydraulic cancel mechanism for a rotating clutch according to claim 14, wherein the said auxiliary oil chamber has a greater volume capacity than a volume capacity of the fluid passageway.

17. The centrifugal hydraulic cancel mechanism for a rotating clutch according to claim 14, wherein the said auxiliary oil chamber has an opening which opens towards the central axis.

18. The centrifugal hydraulic cancel mechanism for the rotating clutch according to claim 14, wherein the first cylindrical body comprises a clutch drum which has the frictional plates on its inner surface, a piston housing which is formed as one unit with the clutch drum and accommodates the piston in a liquid-tight condition, and a cylindrical boss which is formed on an inner portion of the piston housing as one unit and has a smaller diameter than the second cylindrical body, wherein the piston has a cylindrical protruding portion on its outer portion sticking out towards the frictional plates, wherein a balance piston is inserted between the outer surface of the boss and the inner surface of the protruding portion in a liquid-tight condition and is fixed to the boss, which forms the cancel chamber between the piston, and wherein the auxiliary oil chamber is formed at the inner side of the boss and the fluid passageway is formed through the boss.

* * * * *